United States Patent
Perales Bañon

(10) Patent No.: US 12,528,990 B2
(45) Date of Patent: Jan. 20, 2026

(54) METHOD FOR PREVENTING DAMAGE CAUSED BY A FIRE

(71) Applicant: SUCCESS WORLD, S.L., Huesca (ES)

(72) Inventor: Ramon Perales Bañon, Lleida (ES)

(73) Assignee: Success World, S.L., Monzon (ES)

( * ) Notice: Subject to any disclaimer, the term of this patent is extended or adjusted under 35 U.S.C. 154(b) by 64 days.

(21) Appl. No.: 18/150,020

(22) Filed: Jan. 4, 2023

(65) Prior Publication Data

US 2023/0151276 A1 May 18, 2023

Related U.S. Application Data

(62) Division of application No. 17/266,268, filed as application No. PCT/ES2018/070547 on Aug. 6, 2018, now abandoned.

(51) Int. Cl.
  *C09K 21/02* (2006.01)
  *A62D 1/00* (2006.01)
  *C09K 21/06* (2006.01)

(52) U.S. Cl.
  CPC ............ *C09K 21/02* (2013.01); *A62D 1/0035* (2013.01); *C09K 21/06* (2013.01)

(58) Field of Classification Search
  CPC ...... A62D 1/00; A62D 1/0028; A62D 1/0035; A62D 1/0042; A62D 1/005; A62D 1/0071; C09K 21/00; C09K 21/02; C09K 21/06; C09K 21/14; C09K 2101/00
  See application file for complete search history.

(56) References Cited

U.S. PATENT DOCUMENTS

| | | | |
|---|---|---|---|
| 4,387,032 A | 6/1983 | Chiesa, Jr. | |
| 4,464,267 A | 8/1984 | Chiesa, Jr | |
| 4,676,918 A | 6/1987 | Toth | |
| 6,080,330 A | 6/2000 | Bloomer | |
| 6,149,834 A * | 11/2000 | Gall | C09K 3/185 106/13 |
| 6,398,979 B2 | 6/2002 | Koefod | |
| 6,416,684 B1 | 7/2002 | Bloomer | |
| 6,596,188 B1 * | 7/2003 | Hartley | C09K 3/185 106/13 |
| 6,878,308 B2 * | 4/2005 | Schilling | C09K 3/18 106/13 |
| 6,984,339 B2 * | 1/2006 | Uang | C09K 5/20 252/75 |
| 7,563,386 B2 | 7/2009 | Bytnar | |
| 8,226,846 B2 | 7/2012 | Hartley | |
| 2004/0111962 A1 * | 6/2004 | Lizuka | C05G 5/30 47/57.6 |
| 2008/0093579 A1 | 4/2008 | Knauf | |
| 2008/0196908 A1 * | 8/2008 | Schaefer | A62D 1/0071 252/3 |
| 2017/0056698 A1 | 3/2017 | Pai | |

FOREIGN PATENT DOCUMENTS

| | | | | |
|---|---|---|---|---|
| AU | 2005220194 A1 * | 4/2007 | | |
| CN | 106514821 A | 3/2017 | | |
| DE | 2937333 A * | 4/1981 | ........... | A62D 1/0035 |
| DE | 2937333 A1 | 4/1981 | | |
| EP | 718388 A2 | 6/1996 | | |
| EP | 1279714 A2 | 1/2003 | | |
| EP | 1853358 B1 | 11/2007 | | |
| EP | 2322581 A1 | 5/2011 | | |
| EP | 3339397 A1 | 6/2018 | | |
| ES | 2422217 T | 9/2013 | | |
| GB | 190023890 A | 2/1901 | | |
| JP | H 10192444 A | 7/1998 | | |
| KR | 20080001702 A | 1/2008 | | |
| RU | 2204547 C2 | 5/2003 | | |
| RU | 2290240 C1 | 12/2006 | | |
| RU | 2622838 C1 | 6/2017 | | |
| RU | 2656035 C1 | 5/2018 | | |
| WO | WO 93/02788 A1 | 2/1993 | | |
| WO | WO 2006094077 A2 | 9/2006 | | |
| WO | WO-2008058324 A1 * | 5/2008 | ........... | A62D 1/0028 |
| WO | WO 2018/134393 A1 | 7/2018 | | |
| WO | WO-2024054489 A2 * | 3/2024 | ............ | C09K 21/14 |

OTHER PUBLICATIONS

English language machine translation of Bonin et al. DE 2937333 A1 (Year: 1981).*
International Search Report mailed Feb. 13, 2019; in International Application No. PCT/ES2018/070547.
Office Action issued Jun. 17, 2025, in Colombian Patent Application No. NC2021/0002003, which is related to the present application (English translation provided).

* cited by examiner

Primary Examiner — Matthew R Diaz
(74) Attorney, Agent, or Firm — Knobbe, Martens Olson & Bear LLP

(57) ABSTRACT

A method for preventing damage caused by a fire includes extinguishing the fire by applying a fireproof composition to the fire. The fireproof composition is constituted as an aqueous composition comprising at least one sugar and magnesium chloride (MgCl2). The fire can be a forest, domestic, or industrial fire. The composition can also be applied to protect a product against fire.

5 Claims, No Drawings

METHOD FOR PREVENTING DAMAGE CAUSED BY A FIRE

PRIORITY AND CROSS REFERENCE TO RELATED APPLICATIONS

This application is a divisional of U.S. application Ser. No. 17/266,268 filed Feb. 5, 2021, which is the U.S. National Phase under 35 U.S.C. § 371 of International Application No. PCT/ES2018/070547, filed Aug. 6, 2018, designating the U.S. and published as WO 2020/030830 A1 on Feb. 13, 2020.

FIELD

The present invention relates to the sector of fireproof compositions.

BACKGROUND

In recent years, forest fires, domestic fires and fires in industrial and livestock installations have increased in number and intensity. Accordingly, in recent years a large number and variety of fire protection compositions have been developed.

The increase in the security of the products used against fires has meant that new compositions with fireproof properties are being developed. However, it is known that many chemical fireproof products contain components that may be toxic to human beings and are damaging to the environment.

SUMMARY

The present invention relates to the sector of fireproof compositions and more particularly to a composition for fire protection that produces a carboxylic layer on coming in contact with fire, to a method for preparing said composition and to different uses thereof.

DETAILED DESCRIPTION

The use of compositions that contain sugars as fireproofing agents and fire protection agents is known (see, for example, the publications of PCT WO2008058324A1, European patent EP1853358B1 and South Korean patent KR20080001702A). Thus, the publication of Korean patent KR20080001702A discloses a flame retardant that forms a carboxylic layer which comprises sugar or graphite and a flame retardant chosen from monoammonium phosphate, diammonium phosphate, ammonium polyphosphate and melamine phosphate. However, said fireproof compositions also contain sugars, surfactants, phosphates and other agents that are toxic to human beings and damaging to the environment. Moreover, preparing and using said compositions in some installations is normally problematic owing to the noxiousness and corrosiveness thereof. In addition, the presence of phosphates means that said compositions are very corrosive, which creates storage problems and causes damage to objects following application thereof.

Furthermore, the publication of British patent GB190023890A in 1901 describes an acid-resistant cement for application to protect objects made of cardboard, wood or metal, and particularly for electrical use, which consists of a composite cement comprising magnesium oxychloride, Portland cement and molasses. Said magnesium oxychloride is formed by mixing magnesium oxide and a solution of magnesium chloride, while the molasses are used to dilute the cement. This cement cannot be applied to people or animals owing to the toxicity and corrosiveness of magnesium oxychloride, nor does it form a carboxylic protection layer. In addition, hardening owing to the presence of cement makes its use for extinguishing fires inadvisable, and does not permit extended storage prior to use. Moreover, it cannot be used in fluid installations and or applied to objects without causing irreparable damage.

When fighting forest fires, aeroplanes, particularly tanker aeroplanes, which in many cases are adapted hydroplanes, are used. The chemical products used to combat said fires may include water, water enhancers such as foams and gels, and in particular specially formulated flame retardants. However, the high density of these fireproof compositions limits aeroplane loads.

An additional problem with all the above-mentioned compositions is that the freezing point thereof is equal to or higher than 0° C., leading to storage problems in winter.

To sum up, the compositions known at present have the following drawbacks:
  they are highly corrosive
  they produce salt precipitations over time.

This means said compositions cannot be stored for an extended period of time, or used in fluid installations for extinguishing fires, as said compositions would cause corrosion in the installation and/or blockages owing to the precipitates produced.

Moreover, in some cases the known compositions are only stable under very specific and controlled environmental conditions. Extreme conditions of cold or heat, for example, which occur in summer and/or in winter cannot be withstood.

In view of the above, there is still a need for effective fireproof compositions to reduce and/or eliminate the use of compositions that are damaging to human beings or the environment, are stable over a wide range of temperatures, do not precipitate significantly over time and are not corrosive.

The object of the present invention is to disclose compositions that allow a solution to the above-mentioned problems. Accordingly, a fireproof composition that does not require the presence of toxic components has been developed. The present invention is based on components that are suitable for food use, are biodegradable and do not contaminate the environment. The novel composition acts as a fire blocker.

The present invention discloses a fireproof composition for application to products to protect against fire, which is constituted as an aqueous composition comprising at least one sugar and magnesium chloride. Preferred embodiments of the invention may be applied to animals and people without risk to their health.

In the present invention, the term "sugar" refers to a compound formed of carbon, hydrogen and oxygen, in which the formula $C_n(H_2O)_n$ applies to the composition thereof. Sugars are generally classified as monosaccharides, disaccharides or trisaccharides.

Being aqueous based, the composition of the present invention allows for the magnesium chloride and sugar in contact with flames to form a carboxylic layer which increases in size and protects the object to which the composition is applied. It is therefore a fire blocker.

The composition of the present invention has many advantages. Moreover, the composition is not corrosive and does not precipitate. The composition according to the present invention has a low freezing point, being stable between −30° C. and 70° C. This facilitates the storage of the composition in tanks, pipes, etc. without the need for mechanisms to prevent freezing (heating, recirculation pumps) with the consequent saving in energy. Moreover, it has a high insulating capacity, which allows application to latex, expanded polyurethane, physical persons and many objects. Furthermore, it is a composition that has the ability to adhere very well to surfaces. In addition, it is a non-contaminating product as no component thereof is a toxic product. The product may be eliminated by washing with abundant water.

Magnesium chloride has the property of being a hygroscopic compound, and therefore absorbs humidity and prevents the composition from becoming dehydrated. The longevity of the substance is thus extended once applied to the object, person or animal to be protected. The composition remains on the object to which it was applied, protecting said object from possible fire until said composition is eliminated.

Furthermore, the stability over a wide range of temperatures, non-corrosiveness and lack of precipitations of said substance also make said substance very suitable for storage waiting to be used to extinguish fires. The viscosity thereof is similar to that of water. In particular, the composition may be stored without damaging pipes, tanks and/or fluid impeller pumps.

In the present invention, the sugar is preferably selected from the group consisting of fructose, dextrose, glucose, sucrose, maltose and isomaltose, and sugars contained in molasses. Sucrose is commonly known as "table sugar" or "ordinary sugar".

In the present invention, the term "molasses" refers to a final sub-product of sugar manufacture or refining. It is a dense, viscous liquid which is separated from the low purity massecuite by centrifugation.

Preferably, said sugar has a concentration of between 150 g/l and 1000 g/l in the composition. More preferably, said sugar has a concentration of between 200 g/l and 400 g/l in the composition.

Preferably, said magnesium chloride has a concentration of between 50 g/l and 580 g/l in the composition. More preferably, said magnesium chloride has a concentration of between 150 g/l and 400 g/l. More preferably, said magnesium chloride has a concentration of between 200 g/l and 300 g/l.

Preferably, said composition also comprises a corrosion inhibitor. Said corrosion inhibitor makes it possible for the composition to be applied to any type of object. An example of a corrosion inhibitor might be ethanolamine. The use of any other corrosion inhibitor is also possible, preferably chosen from natural or ecological corrosion inhibitors (also known as eco-friendly inhibitors). In a particularly advantageous way, the corrosion inhibitor will be a deoxygenator.

Preferably, said composition has a final pH of between 6.0 and 7.5. Accordingly, the composition may also comprise a pH regulator. In some applications, the corrosion inhibitor may be suitable for adjusting the pH to the required range on its own.

Preferably, the fireproof composition comprises exclusively components that are innocuous to human beings. More preferably, said composition is free from halogen atoms, particularly fluoride or bromine atoms, and from sulphate or phosphate atoms, among others. In this way, the innocuousness of the composition to animals and people is ensured, which allows both application to people and animals, and ingestion of said composition.

In one embodiment, the inventors of the present invention have developed a composition specifically for this use which, in addition to magnesium chloride and at least one sugar, comprises light magnesium carbonate. A person skilled in the art will understand that when light magnesium carbonate is mentioned, it refers to hydromagnesite ($4MgCO_3 \cdot Mg(OH)_2 \cdot 4H_2O$). Said light magnesium carbonate reduces the density of the fireproof composition and therefore makes transportation in the hydroplanes and helicopters used to extinguish fires such as forest fires particularly advantageous. The density of the composition will preferably be between 0.8 kg/l and 1.1 kg/l. Densities lower than that of water may be achieved with the help of light magnesium carbonate. For aeronautical applications, it will be particularly preferable for the density of the composition to be between 0.8 kg/l and 0.85 kg/l.

Furthermore, the composition can be applied to the forest cover and in particular to any type of plantation with no effect on either the plant or the edibility thereof.

In some applications, particularly those that use molasses, the composition of the present invention, said sugar and said magnesium chloride are in a proportion between 1:0.65 and 1:0.75, respectively. In other embodiments, said proportion is between 1:0.8 and 1:1.1, more preferably 1:1.

In a particularly preferred embodiment, the composition according to the present invention contains exclusively water, sugars (including commercially available sugars) and magnesium chloride, and, optionally, a corrosion inhibitor, a pH regulator, and/or light magnesium carbonate and/or a colorant.

Furthermore, the present invention discloses a method for preparing the fireproof composition for application to products to protect against fire mentioned above, which is constituted as an aqueous composition, characterised in that it comprises the steps of:
a) obtaining at least one sugar and magnesium chloride ($MgCl_2$);
b) dissolving the components of step a) in water; and
c) adjusting the pH of the solution obtained in b) to between 6.0 and 7.5.

Preferably, in said method it is also possible to add light magnesium carbonate in step a).

Furthermore, the present invention discloses the use of the above composition for the prevention of damage caused by fire. Accordingly, the aqueous composition according to the present invention is preferably applied to the area and/or objects to be protected. The aqueous composition according to the present invention may be applied to any type of object such as electrical wiring, cardboard, wood or metal objects. Said composition may also be applied to animals, people and even buildings.

The composition according to the present invention may also be used to extinguish fires, by applying said composition directly to the flames. However, owing to the aqueous nature thereof, said composition is not suitable for fires involving liquids with a lower density than water.

In addition, the present invention discloses the use of the above composition for extinguishing forest fires using aeroplanes, hydroplanes or helicopters. In this case, the hydroplane will be loaded with the substance according to the present invention and will release said substance over the area affected by fire. For this use, it will be preferable for the composition to have a low density, so that a greater volume thereof can be transported.

The present invention also discloses the use of the composition according to the present invention for extinguishing any type of fire, preferably industrial and/or domestic fires, by the application of the composition using fluid installations that have pipes and pumps, such as fire engines and motor pumps. For this use, the lack of corrosiveness of the composition according to the present invention is particularly useful, as is the fact that said composition does not precipitate, which allows the composition to be kept in the installation over a long period, waiting until required for use.

The present invention is illustrated below using examples that do not limit said invention.

EXAMPLES

Example 1: Preparation of Fireproof Compositions According to the Present Invention on a Polyurethane Object Compositions were prepared containing the following agents:
- 900-1,100 cm³ $H_2O$
- 300-400 g/l $MgCl_2$
- 900-1,100 cm³ cane sugar molasses The magnesium chloride and molasses were mixed with the water, and then a small amount (less than 0.1% by weight) of a corrosion inhibitor such as ethanolamine was added. The resulting solutions were applied to an object made of polyurethane. Next, the flame from a blowtorch was applied to simulate flame combustion and heat similar to fire. The combustion contact resulting from the blowtorch with the compositions formed a carboxylic layer. Said carboxylic layer increased in size, and consequently the object made of polyurethane was not heated significantly nor was any significant effect produced thereon.

Example 2: Preparation of Fireproof Compositions According to the Present Invention on Installations Compositions were prepared containing the following agents:
- 900-1,100 cm³ $H_2O$
- 200-300 g/l $MgCl_2$
- 250-350 cm³ sugar The magnesium chloride and the sugar were dissolved in water, then magnesium carbonate ($MgCO_3$) was used as a pH regulator to adjust the pH to between 6.0 and 7.5. The resulting solutions were stored for future use. Using said compositions in installations forms a carboxylic layer on the objects to which the compositions are applied. The transparent colour of sugar means that the installations were not dirtied by the use of said compositions. The composition was applied to an object, which object was left exposed to the elements. The layer of composition lasted for three months until washed off by a precipitation episode of over 30 l/m².

Example 3: Preparation of Fireproof Compositions According to the Present Invention on Wooden Boxes Compositions were prepared containing the following agents:
- 900-1,100 cm³ $H_2O$
- 200-300 g/l $MgCl_2$
- 250-350 cm³ fructose The magnesium chloride and fructose were mixed with the water until completely dissolved. Next, the pH was adjusted to a point between 6.0 and 7.5. The resulting solutions were applied for fire prevention to stored wooden boxes. Fructose, like sugar, is transparent and therefore once the product was applied in the installations, said installations were not dirtied by the compositions. Moreover, the use of the compositions does not cause any noxiousness and/or toxic effect for the objects and people inside said industrial warehouse. The boxes were stored for six months. Next, a check was carried out to ensure that the composition was still present and was activated by the presence of a flame, resulting in a carboxylic layer being produced. It was observed that the porosity of the wood had retained the composition applied in the outer layer, which protects the boxes.

Example 4: Preparation of Fireproof Compositions According to the Present Invention on a Forest Fire Compositions were prepared containing the following agents:
- 450-550 cm³ $H_2O$
- 200-300 g/l $MgCl_2$
- 900-1,100 cm³ molasses
- 50-150 g/l $MgCO_3$ The magnesium chloride, light magnesium carbonate and molasses were dissolved in water. Next, a new generation ecological corrosion inhibitor was added. The resulting solutions were stored until used on a forest fire. In the aeroplanes and helicopters the composition is stored in containers. The dark brown colour of the molasses indicates to the professionals where said compositions were used in the woodland or site where a fire was to be extinguished.

What is claimed is:

1. A method for protecting a product against fire, comprising:
    applying a fireproof composition to the product prior to occurrence of the fire, said fireproof composition constituted as an aqueous composition comprising at least one sugar and magnesium chloride ($MgCl_2$), wherein said magnesium chloride has a concentration of between 200 g/l and 300 g/l in said composition; and
    exposing the product to fire with reduced fire damage compared to a product to which the fireproof composition has not been applied,
    wherein said fireproof composition is free from fluorine or bromine atoms, and from sulphate or phosphate ions such that said composition does not affect edibility of the product; wherein said sugar and said magnesium chloride are in a proportion by mass between 1:0.65 and 1:1.1.

2. The method according to claim 1, wherein said at least one sugar is selected from the group consisting of fructose, dextrose, glucose, sucrose, maltose, isomaltose, and sugars contained in molasses.

3. The method according to claim 1, wherein the fireproof composition consists of water, molasses, and magnesium chloride ($MgCl_2$).

4. The method according to claim 1, wherein said fireproof composition has a final pH of between 6.0 and 7.5.

5. The method according to claim 1, wherein said at least one sugar has a concentration of between 200 g/l and 400 g/l in said composition.

* * * * *